July 24, 1956  J. B. FRAGA  2,755,722
TRACTOR MOUNTED REAR TOOL BAR

Filed Dec. 3, 1952  3 Sheets-Sheet 1

INVENTOR.
JOHN B. FRAGA
BY

July 24, 1956

J. B. FRAGA 2,755,722

TRACTOR MOUNTED REAR TOOL BAR

Filed Dec. 3, 1952

INVENTOR.
JOHN B. FRAGA
BY
ATTY

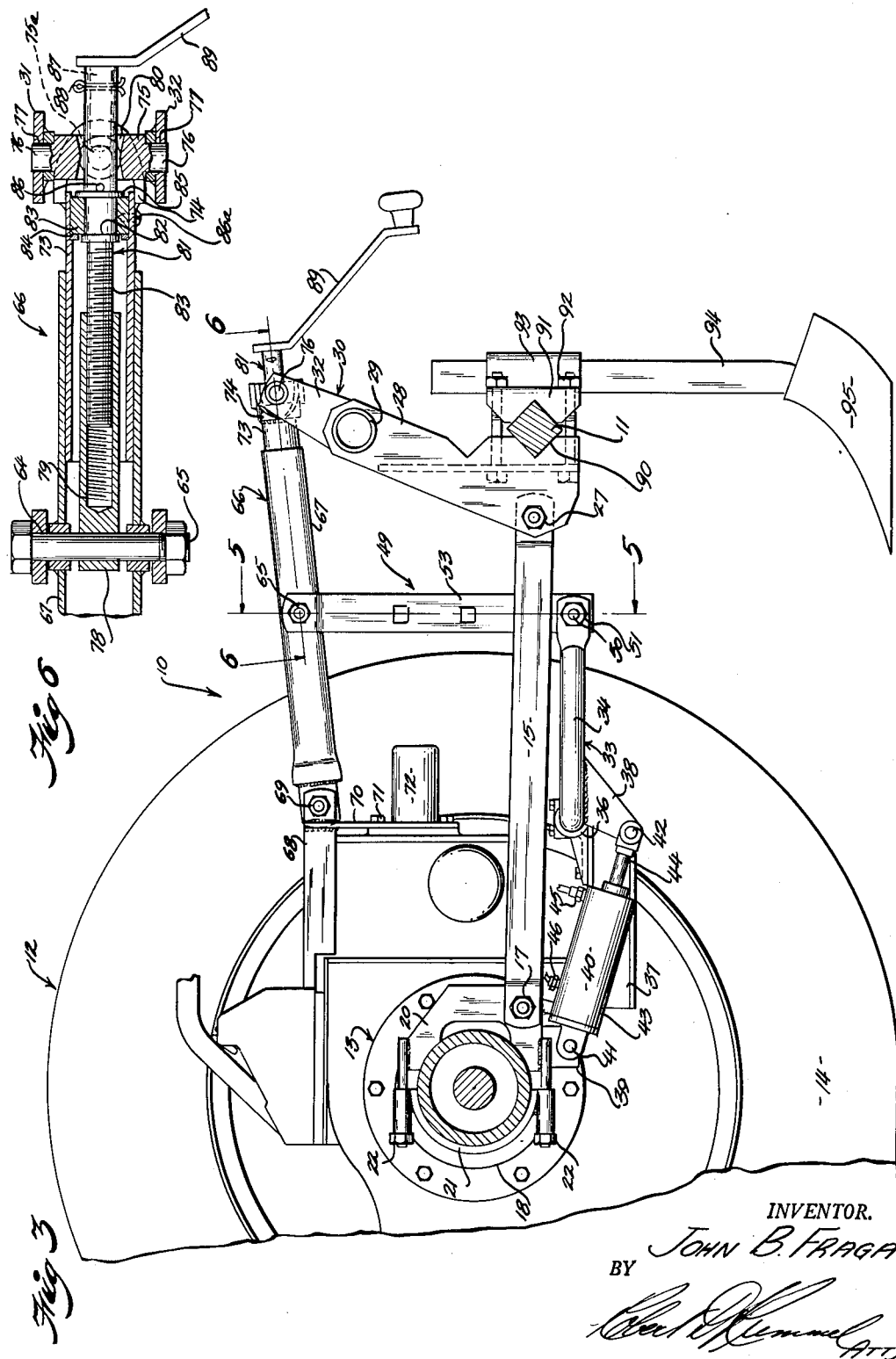

United States Patent Office 2,755,722
Patented July 24, 1956

2,755,722

TRACTOR MOUNTED REAR TOOL BAR

John B. Fraga, Stockton, Calif., assignor to J. I. Case Company, Racine, Wis., a corporation of Wisconsin Application December 3, 1952, Serial No. 323,867

13 Claims. (Cl. 97—46.93)

The present invention relates to a tractor-mounted implement, and more particularly to an interconnecting means between a tractor and a relatively wide implement such as a tool bar, which interconnecting means includes means for swinging the implement from a working to a nonworking position, for tilting the implement with respect to the horizontal, and for rocking the implement about its longitudinal axis.

A further object of the present invention is to provide an interconnecting means for integrally mounting a relatively wide implement such as a tool bar to a tractor which means is so constituted as to cause an automatic equalization of the draft forces imposed upon the opposite ends of the implement.

Another object is to generally improve the operation and construction of mechanisms of this type.

The foregoing and other important objects and desirable features inherent in and encompassed by the invention will become apparent to those skilled in the art as a complete disclosure of the invention is made in the following detailed description, taken in conjunction with the accompanying sheets of drawings wherein there is shown, by way of example, a preferred form of the invention.

In the drawings:

Fig. 3 is a sectional view taken on the line 3—3 of Fig. 1, slightly enlarged and with parts removed.

Fig. 4 is a rear view of certain structure shown in Fig. 2, with parts removed.

Fig. 5 is a substantially vertical sectional view taken on the line 5—5, of Fig. 3, with parts removed.

Fig. 6 is a substantially horizontal sectional view taken on the line 6—6 of Fig. 3, with parts removed.

Figure 1:
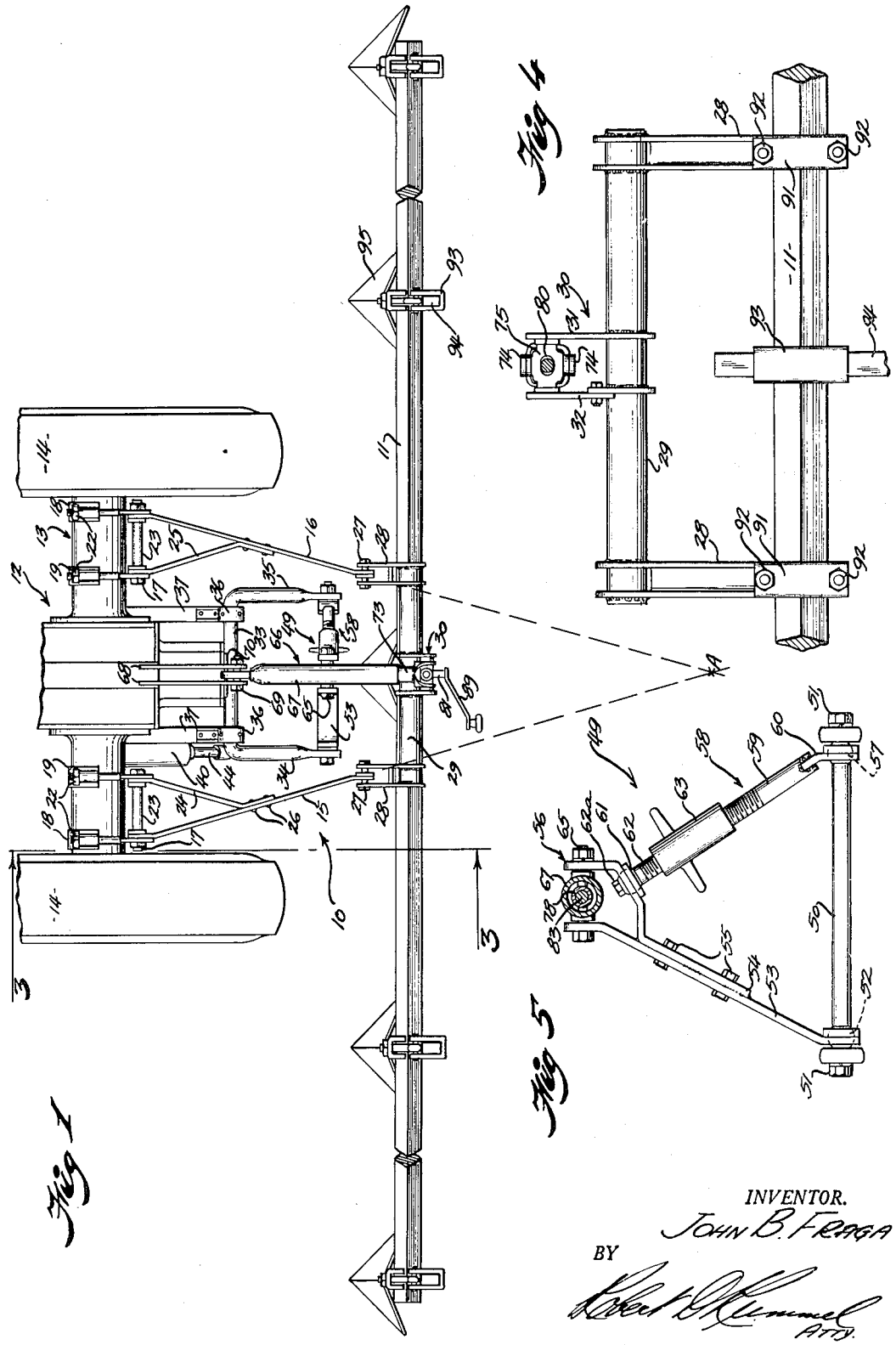
Fig. 1 is a plan view of a tractor, only the rear portion of which is shown, a relatively wide implement, such as a tool bar, and interconnecting means for connecting the tool bar to the tractor, with parts removed.
Figure 2:
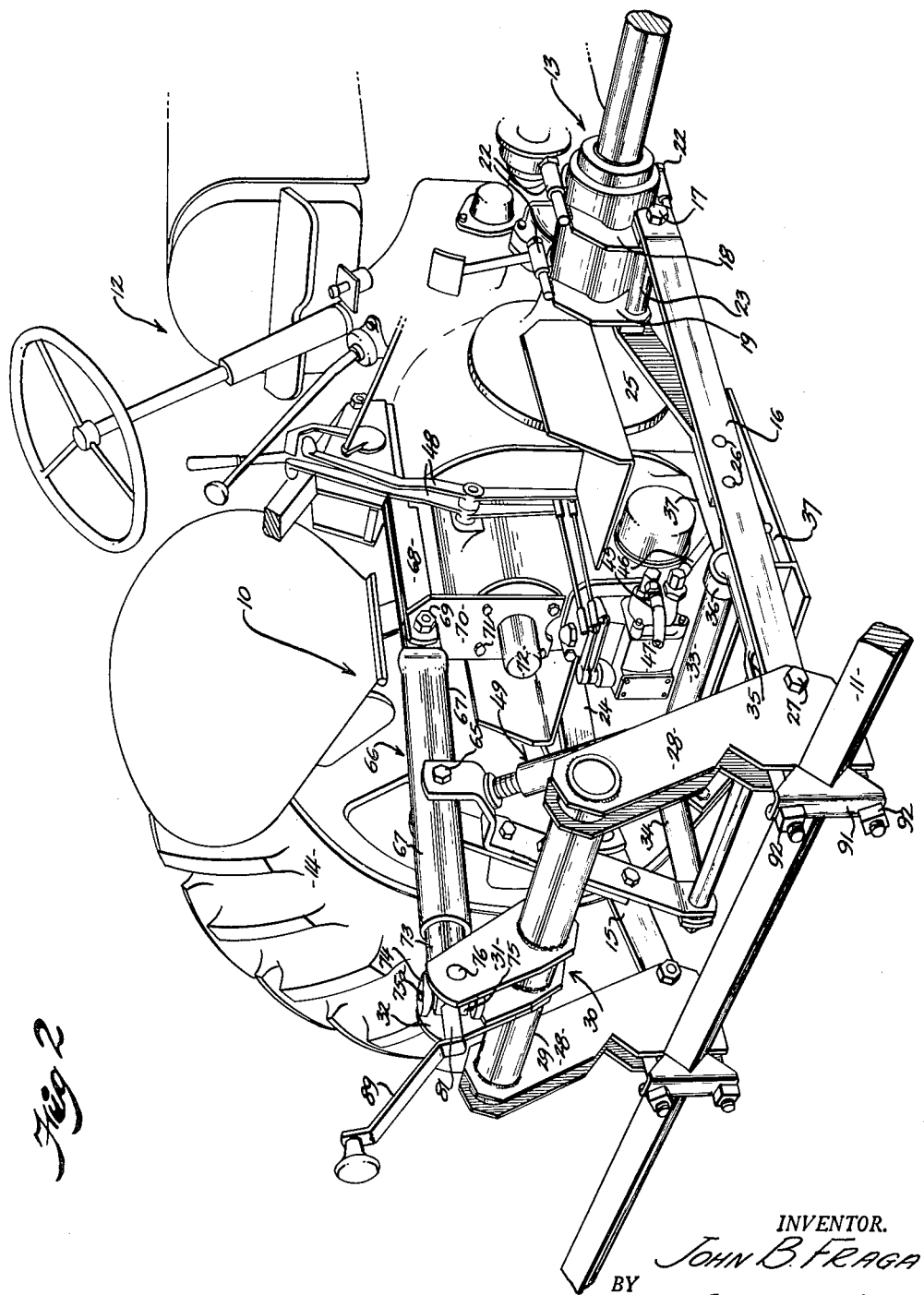
Fig. 2 is a right-rear perspective view of the combination shown in Fig. 1, slightly enlarged and with parts removed to more clearly show details in construction.

Referring to Figs. 1, 2, and 3 of the drawings, an interconnecting linkage, generally designated by the number 10, is provided for effecting integral mounting of a rear tool bar 11 to a tractor 12, only the rear portion of the tractor being visible in the drawings. It will be appreciated that hitherto the practical use of a tractor mounted rear tool bar providing an overall tool spacing greater than the space between the rear drive wheels of the tractor was limited by the factor of unequal draft forces being imposed upon the rear tool bar so as to make the tractor unmanageable as far as steering thereof was concerned. The tool bar 11 in the present instance is so interconnected with the tractor that a preponderance of draft force imposed upon one end of the tool bar will automatically cause the tool bar to move in a peculiar manner so that the draft forces imposed upon the opposite ends of the tool bar will be substantially equalized, thereby allowing the tractor to be easily steered along a predetermined path.

The tractor 12 is capable of being of any suitable or well-known construction and preferably includes in the present instance a rear axle housing 13 which supports adjacent its opposite ends a pair of rear traction wheels 14. The mechanisms comprising the front portions of the tractor are not visible in the drawings since details of these mechanisms form no part of the present invention.

The interconnecting linkage 10 in the present instance consists of a pair of rearwardly converging draft links 15 and 16 pivotally secured by means of suitable pivot bolts 17 to suitable strap brackets 18 and 19, the strap brackets 18 and 19 being received by the rear axle housing 13 of the tractor and being arranged in pairs adjacent the opposite ends thereof so that the strap brackets 18 are positioned adjacent the respective rear traction wheels 14. Each of the strap brackets 18 and 19 is formed from substantially semi-circular bracket segments 20 and 21 which are rigidly interconnected and clamped to the circumferential surface of the rear axle housing 13 by means of suitable bolts 22, each pair of the brackets 18 and 19 being positioned in spaced apart relationship on the housing 13, and each bracket segment 20 of each pair of brackets 18 and 19 being interconnected by a suitable tubular spacer 23. Pivot bolts 17 interconnect the respective brackets 18 and 19 and are received in the spacers 23, the links 15 and 16 being received by the bolts 17 adjacent the brackets 18 and being so supported as to be capable of swinging movement up and down about substantially co-axial axes, bolts 17 being supported in substantially co-axial relationship. The links 15 and 16 are so shaped as to act as flat springs and lateral deflection thereof from side to side is caused in response to a predetermined force as will be more fully appreciated hereinafter. Diagonal brace members 24 and 25 are secured to the draft links 15 and 16 respectively substantially medially of their lengths by means of suitable rivets 26, and forwardly the brace members 24 and 25 are pivotally received by the pivot bolts 17 adjacent brackets 19 for permitting up and down swinging of the members 24 and 25 in accordance with up and down swinging movement of the respective draft links 15 and 16.

Adjacent the rearward end of each of the draft links 15 and 16 is pivotally carried by means of a transverse pivot bolt 27 an upwardly extending standard 28, and the standards 28 are rigidly interconnected by a cross member 29, substantially tubular in cross section and fixed as by welding or the like to the respective standards 28 adjacent the upper ends thereof, see also Fig. 4. The cross member 29 has fixed thereto as by welding or the like an upwardly extending standard 30, the standard 30 being formed of rigid plates 31 and 32 positioned in spaced apart relationship, the standard 30 being positioned substantially medially of the length of the cross member 29.

The tractor 12 in the present instance is provided with a lifting bail 33 which is substantially U-shaped having rearwardly extending lift arms 34 and 35. The lifting bail 33 is swingably supported in suitable bearings 36 carried adjacent the rearward ends of rearwardly extending supporting structures 37, supporting structures 37 being rigidly fixed to the rear axle housing 13 of the tractor. The lift arm 34 is provided with a downwardly depending rock arm 38 which is suitably apertured adjacent the lower end thereof. A suitable apertured anchorage 39 is formed forwardly on the rear axle housing 13 of the tractor in substantially fore-and-aft alignment with respect to the rack arm 38, and a hydraulic power motor 40 is interconnected between the anchorage 39 and the rock arm 38 by means of suitable connecting pins 41 and 42. The hydraulic power motor 40 can be of any well-known or suitable construction and comprises in the present instance a cylindrical portion 43 and an extensible piston rod 44, piston rod 44 being fixed adjacent the end thereof to a piston, not visible in the drawings, which is slidable in the cylindrical portion 43 in response to fluid hydraulic power being selectively delivered into the power motor 40 by way of conduits 45 and 46. A suitable hydraulic system of any well-known or suitable construction, not shown in the drawings, is carried by the tractor and includes a selector valve 47 which is interconnected to the fluid motor 40 by means of the conduits 45 and 46 and which is under complete control of the operator by means of suitable operating levers 48 so that the operator from his position on the tractor can cause the piston rod 44 to move rearwardly or forwardly so as to cause rocking of the lifting bail 33 upwardly or downwardly about the axis of bearings 36.

The lift arms 34 and 35 carry adjacent their rearward ends a mast assembly or A-frame designated as number 49, see also Fig. 5. A-frame 49 includes a transverse rigid member or rod 50 which is received in suitable apertures formed in the rearward ends of the lift arms 34 and 35 and which is secured thereto by means of suitable nuts 51. The rod 50 adjacent the lift arm 34 has formed thereon a spherical bearing surface 52 and an upwardly extending member 53 is received by the bearing surface 52 so as to be supported thereby while still being permitted to swing from side to side a predetermined amount. A clevis member 54 is secured to the member 53 as by bolts or the like 55, and the upper end of the member 54 is bent sufficiently toward the lift arm 35 and upwardly to form in conjunction with the upper end of the member 53 a suitable clevis broadly designated as 56. The rod 50 adjacent the lift arm 35 is also provided with a spherical bearing surface 57, and a turn buckle link 58 is provided for interconnecting the rod 50 to the clevis member 54 adjacent the clevis 56. The turn buckle link 58 includes a threaded member 59 which has welded to the lower end thereof a connecting element 60 which in turn is swingably received by the bearing surface 57. The member 54 adjacent clevis 56 rotatably supports a spherical bearing 61, the bearing 61 being held against displacement out of member 54. The bearing 61 is suitably apertured and receives therein one end of a threaded element 62 which is drawn rigidly against the bearing 61 by means of a suitable nut 62a, the element 62 being swingable from side to side while still being held against axial movement with respect to bearing 61. A turn buckle portion 63 is provided for interconnecting threaded element 62 and threaded element 59 and also for effecting lengthening, or shortening of the turn buckle link 58 in a well-known manner, the adjustability of the turn buckle link 58 as far as length is concerned being effective for causing tilting of the tool bar 11 with respect to the horizontal as will be more fully appreciated hereinafter. The members 53 and 54 of the clevis 56 have formed therein aligned openings 64, and a suitable bolt 65 is provided for securing a middle link 66 between the members 53 and 54 of the clevis 56, the middle link 66 being constrained against substantially all side to side play between the members 53 and 54 of clevis 56.

The middle link 66 in the present instance consists of a tubular member 67 pivotally secured adjacent its forward end between rearwardly extending brackets 68 by means of a transverse pivot bolt 69. The brackets 68 are suitably fixed adjacent their forward ends to the rear axle housing 13 of the tractor and are supported adjacent their rearward ends in a substantially horizontal position by means of an upwardly extending bracket 70 fixed to the tractor by means of bolts 71, the bracket 70 also being provided with a suitable tubular element 72 which receives therein the power take-off shaft of the tractor and acts as a guard therefor when the same is not in use.

A tubular member 73 is slidably received in the tubular member 67 and has secured as by welding to the rearward end thereof a U-shaped yoke 74, see also Fig. 6. The individual arms of the yoke 74 are suitably apertured and rotatably receive therein upper and lower arms 75a of a spider 75, spider 75 being provided with oppositely extending transverse arms 76 which are rotatably received in suitable apertures 77 formed in the members 31 and 32 of the standard 30, the arms 75a and 76 being circumferentially spaced about the axis of spider 75 and positioned substantially 90° from each other. Yoke 74, spider 75, tubular member 73 and standard 30 constitute mechanism for swivelly connecting the middle link 66, adjacent its rear end, to the tool bar 11 at a point vertically spaced from the tool bar 11.

An adjusting means is also provided for effecting locking of the tubular member 73 in various axial positions with respect to the tubular member 67. This means includes a rod 78 received in the tubular member 67 and secured by the bolt 65 and so positioned as to extend into the tubular member 73, the rod 78 having formed therein an axially extending threaded bore 79. An opening 80 is formed in the spider 75, and a rod 81 having a shoulder 82 and a threaded portion 83 formed thereon is received in the tubular member 73 by way of opening 80 and threaded into the threaded bore 79 of the rod 78. A suitable thrust bearing 83 is received in the tubular member 73 adjacent the rearward end thereof and abutted against a stop 84 fixed to the inner circumference of member 73. A suitable washer 85 is received by the rod 81 and prevented from moving axially to the right, Fig. 6, by means of a suitable pin 86, rod 81 being prevented from shifting axially to the left in Fig. 6, relatively to bearing 83. The thrust bearing 83 is axially fixed in the tubular member 73 by any suitable means, such as a screw 86a in the present instance. A shank 87 is received in a bore formed in the rod 81 and is secured therein by means of a cotter pin or the like 88, the shank 87 having fixed to the end thereof a suitable handle 89. It will be appreciated therefore that the operator by turning the handle in one direction can thread the rod 78 off the threaded portion 83 of the rod 81 so that the tubular member 73 is pushed rearwardly out of the tubular member 67 causing the middle link 66 to thereby become lengthened. By turning the handle 89 in the opposite direction, the rod 78 can be threaded on the threaded portion 83 of the rod 81 for effecting shortening of the middle link 66, the tubular member 73 in this instance being telescoped into the tubular member 67. It will be appreciated that longitudinal adjustment of the middle link 66 effects a fore-and-aft rocking movement to the standards 28, interconnecting member 29, and standard 30 which as will be more fully appreciated causes rocking of the tool bar 11 about its longitudinal axis thereby adjusting the angle or "suck" of any ground working tools attached to bar 11.

The standards 28 adjacent the lower ends thereof have formed thereon rearwardly open horizontally aligned notches 90, and the tool bar 11 is secured in these notches 90 by means of suitable clamps 91, the clamps 91 each being secured to its respective standard 28 by means of suitable bolts 92 in a manner well-known in the art. The tool bar 11 is so supported as to be carried in a transverse position with respect to the direction of travel of the tractor, and the tool bar 11 is preferably formed of a length so that the ends thereof extend substantially beyond the lateral limits of the rear traction wheels 14 of the tractor. Suitable tool clamps 93 are provided for rigidly fixing to the tool bar downwardly depending tool supporting bars 94, and a suitable cultivating shovel 95 is carried adjacent the lower end of each of the tool supporting bars 94 in a manner well-known in the art.

From the foregoing description of the various parts of the interconnecting linkage 10 and the rear tool bar construction 11, it will be noted that the tool bar 11 is suspended from a point generally positioned well above the ground and vertically spaced with respect to the tool bar 11. This point of suspension is fixed with respect to any substantial side to side movement, the tilt of the tool bar 11 with respect to the horizontal having previously been fixed by adjustment of turn buckle link 58, and capable only of being moved up or down in a vertical plane upon the lift arms 34 and 35 being rocked by the hydraulic motor 40, the interconnection between the forward end of the middle link 66 and the pivot bolt 69 being preferably such that substantially no side to side play of the middle link is allowed at this point. It will be appreciated that the A-frame 49 which interconnects the middle link 66 with the swingable bail 33, and which is constituted in the form of a triangle, is instrumental in preventing side to side movement of the middle link and consequently of the point of suspension between the middle link and the tool bar.

As previously suggested the draft links 15 and 16 converge from the front to the rear, and, together with their respective brace members 24 and 25, are rockable up and down about transverse substantially co-axial pivots. It was also pointed out that the draft links 15 and 16 are formed so as to act as flat springs so that the tool bar 11, considering for a while that the standard 30 is not present, upon a preponderance of draft force's being imposed upon one end of the tool bar, such for instance as when the shovels 95 adjacent the left end thereof as viewed in Fig. 1 dig too deeply into the ground, will tend among other things to swing about an imaginary axis positioned rearwardly of the tool bar and located substantially at the intersection of the projected longitudinal axes of the draft links 15 and 16. Therefore, when a preponderance of draft force is imposed for instance upon the left end of the tool bar, the tool bar will be caused to swing to the left about the center located at the intersection of the projected longitudinal axes of the draft links, this center being designated by the letter A. Consider now that the standard 30 rotatably received the legs 76 of the spider 75 so that the tool bar is swively suspended from a point vertically spaced above the tool bar. Therefore, when the shovels 95 adjacent the left end of the tool bar are digging too deeply into the ground so as to cause a preponderance of draft force to be imposed upon the left end of the tool bar, a composite motion is imparted to the tool bar 11. This composite motion has one component thereof in the horizontal plane and the other component thereof in a vertical plane, the component in the horizontal plane being caused by the tendency of the draft links 15 and 16 to act as flat springs and bend sufficiently to permit the tool bar 11 to swing to the side upon which a preponderance of draft force is being imposed about the axis A, and the vertical component being effected in the present instance by the swivel connection between the middle link 66 and the tool bar 11 at a point vertically spaced from the tool bar, the middle link, as hereinbefore stated, being constrained against movement from side to side. This composite motion will therefore cause a slight swinging movement of the tool bar 11 to the left about the axis A upon the shovels' adjacent the left end of the tool bar digging too deeply into the ground, and since the middle link 66 is swively connected to the tool bar 11 at a point vertically spaced from the tool bar, and since the middle link 66 is constrained to move only in the vertical plane, the tool bar will be caused to tilt in a plane substantially at right angles to the longitudinal plane of the tractor upon the tool bar's being moved to its left about the axis A so that the shovels 95 adjacent the left end of the tool bar, which as previously suggested were digging too deeply so as to cause a preponderance of draft force to be imposed upon that end of the tool bar, will be moved upwardly a predetermined amount, and the shovels 95 adjacent the right end of the tool bar will fall or be caused to move downwardly an amount equal to the distance moved by the left-hand shovels upwardly, the shovels on the left in this instance being presumed to be spaced from the longitudinal axis of the tractor to the same extent as the shovels on the right. More specifically, any movement of the tool bar 11 lessening the tool depth of the shovels adjacent one end thereof will result in an added depth to the shovels adjacent the other end thereof. Therefore an excess of draft force on one end of the tool bar 11, because of the convergence of the draft links 15 and 16 and further because these draft links act as flat springs so as to bend from side to side in response to a given force, causes the tool bar to shift in a horizontal plane to the side of greater load, producing thereby a deflection of the draft links 15 and 16 and tilting of the tool bar in a plane substantially at right angles to the longitudinal plane of the tractor. This composite motion causes the tool bar on the more heavily laden end to move toward that end which in turn causes tilting of the tool bar sufficiently to shaft the load to the opposite end of the tool bar, the result being an automatic equalizing of the draft forces imposed upon the respective ends of the tool bar, substantially even depth of cultivating, and the avoiding of any objectionable side draft on the tractor.

What is claimed:

1. An interconnecting linkage for mounting a tool bar to a tractor and for effecting automatic equalization of the draft forces imposed upon the tool bar comprising a pair of rearwardly converging draft links connected to said tool bar and swingably connected to said tractor so as to cause sideward swinging movement of said tool bar toward the end thereof upon which a preponderance of draft force is imposed, an upper link swingably connected to said tractor, an upwardly extending mast carried by said tool bar and swively connected to the other end of said upper link at a point spaced above said tool bar, and a power operated lifting arrangement carried by said tractor and connected to said upper link for causing said upper link to swing upwardly for moving said tool bar into a raised position, said lifting arrangement including means restraining said upper link against side to side swinging movement, whereby an excessive draft force imposed at one end of the tool bar will cause said tool bar to shift to the side of greater load, thereby causing the bar on the more heavily laden end to rise for shifting the load to the opposite end thereof.

2. A hitch for draft connecting a rear mounted tool bar to a tractor for automatically equalizing the draft loads imposed upon the tool bar while in operation comprising spaced rearwardly converging draft links swingably connected to said tractor for up and down swinging movement about substantially co-axial axes, said draft links being sufficiently resilient to bend from side to side in response to a predetermined load, a middle link vertically spaced above said draft links and swingably connected for up and down movement about a transverse axis, suitable clamping means for connecting said tool bar to said draft links adjacent the rearward ends thereof, means for swively connecting said middle link with said tool bar at a point vertically spaced from said tool bar, and power operated means carried by said tractor and connected to said middle link for vertically swinging said middle link for lifting said tool bar into a transport position, an excessive draft force upon being imposed at one end of said tool bar when said tool bar is in operation causing said draft links to be deflected toward that end thereby causing that end of the tool bar to be forced upwardly sufficiently to equalize the draft loads imposed upon the tool bar.

3. A hitch for draft connecting a tool bar to a tractor for automatically equalizing the draft loads imposed upon the respective ends of the tool bar comprising spaced rearwardly converging draft links connected for vertical swinging movement about substantially co-axial axes, connecting means for draft connecting said tool bar to said draft links, said draft links being sufficiently resilient to bend in response to a predetermined draft force imposed upon one end of said tool bar, said tool bar being removed in an arcuate path in the direction of said one end of said tool bar substantially about the point of intersection of the longitudinal axes of said draft links upon said draft links' being bent, a middle link vertically spaced above said draft links and connected to said tractor and swingable about a transverse axis, a swivel connection between said middle link and said tool bar vertically spaced from said tool bar wherein said tool bar upon being swung in said arcuate path by reason of an excessive draft force's being imposed adjacent said one end thereof is caused to tilt sufficiently to equalize the draft loads imposed upon the tool bar, and power operated means connected with said middle link and carried by said tractor for swinging said middle link and consequently said tool bar into a raised position, the last mentioned means including means restraining said middle link against side to side swinging movement.

4. A means for interconnecting a tool bar to a tractor for effecting a composite motion to said tool bar in response to a preponderance of draft forces being imposed upon one end of the tool bar comprising, a pair of rearwardly converging draft links swingably connected to said tractor for up and down swinging movement and extending rearwardly therefrom, a frame interconnecting said draft links adjacent the rearward end thereof, said frame including means for rigidly securing thereto said tool bar so that said tool bar is positioned substantially normal to the direction of travel of said tractor, said draft links by virtue of their rearward convergence causing sideward swinging movement of said tool bar toward the end thereof upon which a preponderance of draft force is imposed, an upper link swingably connected to said tractor, extending rearwardly therefrom and spaced above said draft links, means for swivelly connecting said upper link adjacent the rearward end thereof to said frame at a point spaced above said tool bar, and a power operated lifting arrangement carried by said tractor and connected to said upper link for causing said upper link to swing upwardly for moving said tool bar into a raised position, said lifting arrangement including means restraining said upper link against side to side swinging movement, whereby an excessive draft on one end of the tool bar will cause said tool bar to shift to the side of greater load, thereby causing the tool bar on the more heavily laden end to rise for shifting the load to the opposite end thereof.

5. The structure claimed in claim 4 further characterized by the interconnecting frame being swingably connected to the respective ends of said draft links for fore-and-aft rocking movement, and said upper links being longitudinally adjustable for effecting fore-and-aft rocking of said frame in response to longitudinal adjustment of said upper link.

6. The structure claimed in claim 4 further characterized by said power operated lifting arrangement including means for positioning said tool bar in various tilted positions with respect to the horizontal.

7. A means for interconnecting a tool bar to a tractor for effecting a composite motion to said tool bar in response to a preponderance of draft forces being imposed upon one end of the tool bar, said tractor including a rearwardly extending lifting element swingably carried adjacent the rearward end of said tractor, said interconnecting means comprising a pair of draft links swingably connected to said tractor for up and down swinging movement and extending rearwardly therefrom, a rigid frame interconnecting said draft links adjacent the rearward end thereof, said frame including means for rigidly securing thereto said tool bar so that said tool bar is positioned substantially normal to the direction of travel of said tractor, said draft links being so constituted as to cause sideward swinging movement of said tool bar toward the end thereof upon which a preponderance of draft force is being imposed, an upper link swingably connected to said tractor and extending rearwardly therefrom and spaced above said draft links, means for swivelly connecting said upper link adjacent the rearward end thereof to said frame at a point spaced above said tool bar, a power operated fluid motor carried by said tractor and connected to said lifting arm for swinging said lifting arm in a lifting direction, and a second frame carried by said lifting arm and connected to said upper link for swinging said upper link in a lifting direction in response to said lifting arms being swung in a lifting direction, said second frame restraining said upper link against side to side swinging movement, whereby a preponderance of draft force imposed upon one end of the tool bar when the tool bar is in operation causes said tool bar to shift to the side of greater load, thereby causing the tool bar on the more heavily laden end to rise sufficiently to shift the load to the opposite end thereof.

8. The structure defined in claim 7 further characterized by the interconnecting frame being swingably connected to the respective ends of said draft links for fore-and-aft rocking movement, and said upper link being longitudinally adjustable for effecting fore-and-aft rocking of said interconnecting frame in response to longitudinal adjustment of said upper link.

9. The structure defined in claim 7 further characterized by said second frame including means for positioning said tool bar in various tilted positions with respect to the horizontal.

10. The structure defined in claim 8 further characterized by said second frame including means for positioning said tool bar in various tilted positions with respect to the horizontal.

11. In a draft equalizing implement hitch a relatively wide implement carried and propelled by a tractor and connected thereto at an effective pivot point displaced from the implement horizontally axially of the direction of progress whereby relative backward movement of one end of the implement as a result of excessive draft arising at that end will cause sideward displacement of the implement about said effective pivot point, said implement being also secured to the tractor at an effective pivot point laterally substantially fixed in relation to the tractor and displaced vertically from said implement in such direction that the sideward movement of said implement resulting from said relative backward movement will cause swinging of the implement about the last-mentioned point in the direction necessary to cause upward movement of the end of said implement subject to said backward movement, and relief of said excessive draft.

12. In a draft equalizing implement hitch a relatively wide implement carried and propelled by a tractor, a linkage system connected thereto and to the tractor and constituted to provide sideward movement of the implement about an effective pivot point displaced from the implement horizontally axially of the direction of progress whereby relative backward movement of one end of the implement as a result of excessive draft arising at that end will cause such sideward displacement of the implement, said implement being also secured to the tractor at an effective pivot point laterally substantially fixed in relation to the tractor and displaced vertically from said implement in such direction that said sideward movement of said implement resulting from said relative backward movement will cause swinging of said implement about the last-mentioned point in the direction necessary to cause upward movement of the end of said implement subject to said backward movement, and relief of said excessive draft, and power operated lifting mechanism connected with said linkage system and effective therethrough for lifting said implement into a transport position.

13. An interconnecting linkage for mounting a tool bar to a tractor and for effecting automatic equalization of the draft forces imposed upon the tool bar comprising a pair of rearwardly converging draft links connected to said tool bar and swingably connected to said tractor so as to cause sideward swinging movement of said tool bar toward the end thereof upon which a preponderance of draft force is imposed, an upper link swingably connected to said tractor, an upwardly extending mast carried by said tool bar and swivelly connected to the other end of said upper link at a point spaced above said tool bar, and means restraining said upper link against side to side swinging movement, whereby an excessive draft force imposed at one end of the tool bar will cause said tool bar to shift to the side of greater load, thereby causing the bar on the more heavily laden end to rise for shifting the load to the opposite end thereof.

References Cited in the file of this patent

UNITED STATES PATENTS

| | | |
|---|---|---|
| 1,916,945 | Ferguson | July 4, 1933 |
| 2,438,553 | Fraga | Mar. 30, 1948 |
| 2,462,641 | Hyland | Feb. 22, 1949 |
| 2,527,613 | Zagurski | Oct. 31, 1950 |
| 2,577,002 | Corl, Jr. et al. | Dec. 4, 1951 |
| 2,645,989 | Prince | July 21, 1953 |
| 2,673,509 | Wilson | Mar. 30, 1954 |

FOREIGN PATENTS

| | | |
|---|---|---|
| 556,859 | Great Britain | Oct. 26, 1943 |